United States Patent Office 3,102,047
Patented Aug. 27, 1963

3,102,047
PROCESSES FOR PRODUCTION OF LOW
PERMEABILITY CARBON
Herbert Lawrence Rivington, London, England, assignor to The General Electric Company Limited, London, England
No Drawing. Filed June 16, 1959, Ser. No. 820,572
Claims priority, application Great Britain June 23, 1958
5 Claims. (Cl. 117—46)

The present invention relates to processes for the production of low permeability carbon from carbon of substantially higher permeability.

The permeability to liquids and gases of carbon in the form, for example, of standard commercial graphite constitutes a serious disadvantage to the use of this material for certain applications. One such application, of increasing importance at the present time, lies in the field of nuclear reactors. Taking this field by way of example, graphite is used as a moderator or reflector material in thermal and intermediate nuclear reactors and it is desirable from several points of view that this material should have as low a permeability as possible. Thus, such a low permeability graphite presents fewer problems when fluid cooling medium is passed through channels in a moderator made of this material so as to cool uranium or plutonium fuel elements contained within the channels, more particularly if liquid cooling medium, such as liquid metal, is employed in unlined channels in the graphite. Even with a gaseous cooling medium, where the effects of absorption possibly combined with chemical interaction are not in general so serious, the mass transfer of graphite from one part of a channel to another is appreciably diminished with a low permeability graphite. Again, if the low permeability is associated with a higher bulk density so that the effect is not confined to the surface of the graphite, the efficiency of the material as a moderator or reflector is correspondingly increased.

It is an object of the present invention to provide an improved process for the production of low permeability carbon suitable for such applications.

According to the present invention, a process for the production of low permeability carbon from carbon of substantially higher permeability comprises impregnating the carbon whose permeability is to be reduced with furfural, polymerising the furfural under pressure and heat so as to cause the furfural to become plastic, this being done without a catalyst, and heating the impregnated carbon to a temperature sufficient to carbonise the furfural impregnant.

A simplified flow diagram of a method embodying the present invention is as follows:

---
High permeability carbon.
---
|
---
Impregnated with a liquid consisting essentially of up to 5% of furfuryl alcohol, up to 10% of a cellulose plastic, and the remainder furfural, and the whole of which is carbonizable.
---
|
---
Heated to a temperature in the range of 275° C. to 310° C. over a period of four hours, under a pressure of at least 800 pounds per square inch and in the absence of a catalyst, to polymerize the furfural impregnant.
---
|
---
Heated to a sufficiently high temperature to effect carbonization of the impregnant.
---
|
---
Low permeability carbon.
---

In the specification, "furfural" means "furfuraldehyde" and is to be distinguished from furfuryl alcohol, which is sometimes called "furfural" in the plastics art.

By avoiding the use of a catalyst in this process, the introduction of elements having a relatively high capture cross section for neutrons is avoided.

It may be an advantage to evacuate the pores in the carbon prior to impregnating the carbon with the furfural.

If a graphite specimen treated in this way is to have a low volatile matter content, it may be subjected to a further heating stage in which the specimen is calcined. This further heating may take place at atmospheric pressure either in air or surrounded by graphite powder or nitrogen. Alternatively, the specimen may be heated in a good vacuum. The rate of heating in this further heating stage can be fast, the final temperature of approximately 1000° C. being reached by a gradual increase in temperature at a rate of the order of 300° C. an hour. This heating enables the residual volatile products of decomposition to diffuse gradually out through the small remaining pores in the graphite specimen without the formation of pockets of high pressure gas which might finally force a rapid passage to the surface of the specimen. When this further stage of heating is carried out, it is found that the carbonaceous material left after the decomposition of the furfural under high pressure at the preceding stage shrinks gradually to form a particularly dense, non-porous form of carbon, and graphite impregnated in this way has the minimum content of unwanted volatile products while its permeability is improved by a factor of the order of 100 times after being subjected only once to the complete process.

If a further low permeability is required, the graphite specimen may be again subjected to the whole process, and this repeated application of the process may be continued any desired number of times. Alternatively, the final stage of heating to 1000° C. which is necessary in order to obtain a very pure product may be reserved, the specimen being purified only once after several successive impregnations and subsequent heating to temperatures between 275° C. and 310° C.

It has been found advantageous in certain applications to use, instead of pure furfural, mixtures of furfural with other furan derivatives. For example, with a mixture of 95% furfural and 5% furfuryl alcohol, the method has produced an improved graphite in which the deposited carbon can be readily graphitised. Amounts of furfuryl alcohol in the range 0–5% may be used, but the best results are obtained with from 3–5% of the alcohol.

Because the viscosity of the furfural decreases during the first heating it is an advantage to dissolve in it a quantity of cellulose acetate, ethyl cellulose or other cellulose type plastic; if this is done the dissolved plastic increases the viscosity of the furfural and also forms a skin around the specimen which counters the tendency of the furfural to drain away from the graphite.

Furfural is a solvent for pitch, and mixtures of pitch and furfural may be used for impregnating high permeability carbon in accordance with the invention.

In order that the invention may be more readily understood, a number of specific examples of processes in accordance with the invention, and which I have carried out, will now be described.

In the first example, a specimen of nuclear grade graphite in the form of a tube having an external diameter of ⅝ inch and an internal diameter of ⅜ inch, and having an initial permeability of $1.16 \times 10^{-3}$ darcys (viscosity in poises) was immersed in furfural in a pressure vessel or bomb. The pressure in the bomb was reduced to evacuate the air from the pores in the graphite, and nitrogen was admitted under pressure so that the graphite was impregnated with the furfural. The pressure of the nitrogen was next raised to 1100 p.s.i. and the temperature within the bomb was raised to 305° C., the temperature reaching 250° C. after one hour's heating and 305° C. after a further three hours heating. Under these conditions the furfural first polymerised and then decomposed into carbon, which was deposited within the pores of the specimen, and steam. At the end of this heating stage the bomb was cooled, the pressure was released, and the specimen was removed from the bomb.

The specimen was next subjected to a further heating stage in an atmosphere of nitrogen, the temperature being raised to 1000° C. at a rate of 300° C. per hour, and at the end of this further heating the permeability of the specimen was found to be $9.3 \times 10^{-7}$ darcys. The specimen was heated further to a temperature of 2800° C., to graphitise the carbon deposited in the pores, and the permeability was found to be $2.32 \times 10^{-6}$ darcys.

In the second example, a specimen of nuclear grade graphite in the form of a tube having an external diameter of 5 inches and an internal diameter of 4 inches, and having an initial permeability of $1.2 \times 10^{-3}$ darcys was immersed in a mixture containing 97% furfural and 3% furfuryl alcohol. The pressure was reduced to 26 inches of mercury to evacuate the air from the pores of the graphite, and was raised again by admitting nitrogen to the bomb so that the mixture was caused to penetrate into the pores. The pressure was raised further to 800 p.s.i. and the specimen was heated to 310° C. at a gradually decreasing rate over a period of four hours, the temperature reaching 250° C. after one hour heating. At the end of this heating stage, the mixture having polymerised and decomposed, the bomb was cooled, the pressure was released, and the impregnated specimen was removed.

The specimen was next subjected to a further heat treatment in an atmosphere of nitrogen at atmospheric pressure, the temperature being raised to 1000° C. in three hours. At the end of this further heat treatment the permeability of the specimen was found to be $1.14 \times 10^{-5}$ darcys, and its weight had increased by 4.5%.

In the third example a specimen of nuclear grade graphite in the form of a tube having an external diameter of ⅝ inch and an internal diameter of ⅜ inch, was subjected to five successive treatments each as described in the first example. The specimen was not, however, heated to graphitise the deposited carbon. The bulk density of the specimen after treatment had increased from 1.72 g./cc. to 1.93 g./cc., the tensile strength of the specimen being increased correspondingly, and the permeability was reduced by the order of 1,000,000 times.

In the fourth example, the process according to the first example was carried out but the furfural impregnant contained a small amount, 10% by weight, of ethyl cellulose in solution. Because of the skin formed round the specimen by the ethyl cellulose during the early part of the first heating stage it was not necessary to carry out this stage with the specimen immersed in furfural.

In the fifth example, the process according to the fourth example was carried out using cellulose acetate instead of ethyl cellulose.

If furfural, furfuryl alcohol, and mixtures thereof, are simply heated under pressure, without a carbon body to be impregnated, so that they polymerise and decompose to produce a carbon body, the bulk density of the body after subsequent heating to 1000° C. ranges from about 0.7 g./cc., for furfural, to 1.4 g./cc. for furfuryl alcohol.

I claim:

1. A process for the production of low permeability carbon from carbon of substantially higher permeability, comprising impregnating the carbon whose permeability is to be reduced with a liquid consisting essentially of up to five percent of furfuryl alcohol, up to ten percent of a cellulose plastic and the remainder furfural and the whole of which is carbonizable, polymerizing the furfural by heating the impregnated carbon to a temperature in the range of 275° C. to 310° C. over a period of four hours, under a pressure of at least 800 pounds per square inch and in the absence of a catalyst, and heating the thus impregnated carbon to a sufficiently high temperature to effect carbonization of the impregnant.

2. A process as claimed in claim 1 wherein the impregnating liquid contains at least three percent of furfuryl alcohol.

3. A process as claimed in claim 1, wherein the cellulose plastic is ethyl cellulose.

4. A process as claimed in claim 1, wherein the cellulose plastic is cellulose acetate.

5. A process as claimed in claim 1, wherein the carbon whose permeability has been reduced is carbonized by heating it to 1000° C., the temperature being raised to this figure from room temperature at the rate of 300° C. per hour.

References Cited in the file of this patent

UNITED STATES PATENTS

| | | |
|---|---|---|
| 1,665,235 | Trickey et al. | Apr. 10, 1928 |
| 2,174,887 | Kiefer | Oct. 3, 1939 |
| 2,224,724 | Elsey | Dec. 10, 1940 |
| 2,749,254 | Slyh et al. | June 5, 1956 |
| 2,789,038 | Bennett et al. | Apr. 16, 1957 |
| 2,922,722 | Hutcheon | Jan. 26, 1960 |
| 2,955,958 | Brown | Oct. 11, 1960 |
| 2,962,386 | Doll et al. | Nov. 29, 1960 |